United States Patent [19]
Fedorjaka

[11] Patent Number: 5,324,023
[45] Date of Patent: Jun. 28, 1994

[54] APPARATUS FOR SECURING FLEXIBLE SHEET MATERIAL TO A ROTATABLE DRUM SURFACE

[75] Inventor: John Fedorjaka, Rochester, N.Y.

[73] Assignee: Eastman Kodak Company, Rochester, N.Y.

[21] Appl. No.: 66,685

[22] Filed: May 24, 1993

[51] Int. Cl.$^5$ .............................................. B65H 5/14
[52] U.S. Cl. ..................................... 271/277; 271/82
[58] Field of Search ................................. 271/82, 277

[56] References Cited

U.S. PATENT DOCUMENTS

| | | | |
|---|---|---|---|
| 2,049,917 | 8/1936 | Mallina | 178/7 |
| 2,618,702 | 11/1952 | Thompson | 178/7.1 |
| 3,903,795 | 9/1975 | Suzuki | 101/409 |
| 3,918,707 | 11/1975 | Villemer et al. | 271/277 |
| 4,033,575 | 7/1977 | Fujimoto | 271/3 |
| 4,135,198 | 1/1979 | Fujimoto | 346/138 |
| 4,138,102 | 2/1979 | Palmer | 271/3 |
| 4,183,652 | 1/1980 | Yanagawa | 355/3 |
| 4,219,272 | 8/1980 | Brückel et al. | 355/16 |
| 4,517,575 | 5/1985 | Kakimoto | 271/277 X |
| 4,807,867 | 2/1989 | Lippold et al. | 271/277 |
| 4,824,096 | 4/1989 | Fichter | 271/82 X |
| 4,903,957 | 2/1990 | Binder | 271/82 X |
| 4,905,985 | 3/1990 | Nagatani | 271/277 |

*Primary Examiner*—Richard A. Schacher
*Attorney, Agent, or Firm*—Frank H. Boos

[57] ABSTRACT

A sheet material handling apparatus having a rotatable drum and clamps for holding the sheet material on the drum during high speed rotation. The clamps are arranged to rely on centrifugal force as the primary operational clamping force during the high speed rotation. One clamp is eccentrically mounted on a pivot axis with a greater mass on a segment of the clamp adapted to pivot away from the drum surface during high speed rotation. A second clamp is contacted by a slidable counterweight mounted on the drum opposite the central rotation axis of the drum from the second clamp such centrifugal force of the counterweight enhances clamping of the sheet material to the drum surface.

3 Claims, 6 Drawing Sheets

APPARATUS FOR SECURING FLEXIBLE SHEET MATERIAL TO A ROTATABLE DRUM SURFACE

FIELD OF INVENTION

This invention relates to the field of high speed rotatable drum sheet handlers and more specifically to apparatus for securing flexible sheet material to such sheet handlers used, for example, in electrostatic copier or photographic film or print read/write apparatus.

BACKGROUND

Many applications require the temporary securing of a flexible sheet of material to a rotatable drum. Apparatus such as electrostatic copiers and facsimile machines as well as photographic and graphic film/print apparatus are examples of equipment requiring the supporting of a sheet of paper or film during the reading and writing processes.

Specific examples of such apparatus are found in U.S. Pat. No. 4,033,575-Fujimoro and U.S. Pat. No. 4,807,868-Lippold which show two types of automatic sheet feed and delivery apparatus employing rotatable cam and lever mechanisms for controlling clamps that hold the sheet material on the drum. The apparatus shown in the '575 patent has the disadvantage that very complex and costly apparatus is employed in the clamping arrangement that becomes difficult and expensive to operate and maintain. In the '867 patent, less complex leading and trailing edge clamps are shown for securing the sheet to the drum which relies on the spring tension of the clamps themselves for the securing force. This latter arrangement has the disadvantage of having the clamps being susceptible to centrifugal force, reducing the spring tension applied to the sheet clamps and, as a consequence, reducing the sheet holding properties of the clamp arrangement which can be a particular problem at higher rotational speeds.

It is apparent from the foregoing that there is a need for relatively simple and easy to operate and maintain apparatus for a rotating drum sheet handler that reliably retains the sheet material on the drum in the face of centrifugal forces encountered during rotation of the drum that adversely affect the clamping action of the sheet material clamps. The present invention satisfies this need.

It is therefore an object of the invention to provide a new and improved apparatus for mounting a flexible sheet of material securely onto a rotatable drum.

It is another object of the invention to provide an apparatus for supporting a flexible sheet of material securely on a rotatable drum with minimal contact to the major area of the outfacing sheet surface.

A further object of the invention is to provide an apparatus for securing a sheet of flexible material to a drum which is particularly suited for high-speed rotation of the drum.

SUMMARY OF THE INVENTION

In accordance with the invention, there is provided apparatus for rotating a flexible sheet of material about a central axis of rotation, the apparatus including a drum having a cylindrical surface rotatable about said central axis, a sheet material clamp for clamping an edge of the flexible sheet onto the drum surface, spring bias means for providing said clamp with an initial clamping force on the sheet material and clamp releasing means for selectably releasing the clamp from the sheet material. The apparatus of the invention is particularly characterized by the clamp having a mass so associated therewith as to transfer operational centrifugal force to the clamp to serve as the primary clamping force for securing the sheet to the drum at operational rotating speeds of the drum.

An important advantage of the present invention utilizing operational centrifugal force as the primary means of securing the flexible sheet to the drum surface lies in the fact that the higher the rotational speed, the more securely the flexible sheet material is held on the drum surface. A further significant advantage is that only a reduced secondary force is required of the springs which provide the initial force used in spring biasing the clamps toward the drum surface. This reduced spring force requirement on the clamps results in a decreased load and unload torque requirement on the motor and sheet handling system. The resultant clamping arrangement is relatively simple in design, with a limited number of moving parts. The arrangement minimizes damage to the sheet material during load and unload operations while at the same time maintaining a tight 'wrap' of the sheet material about the drum surface during the higher speed reading and writing operations.

DETAILED DESCRIPTION

Figure 1:
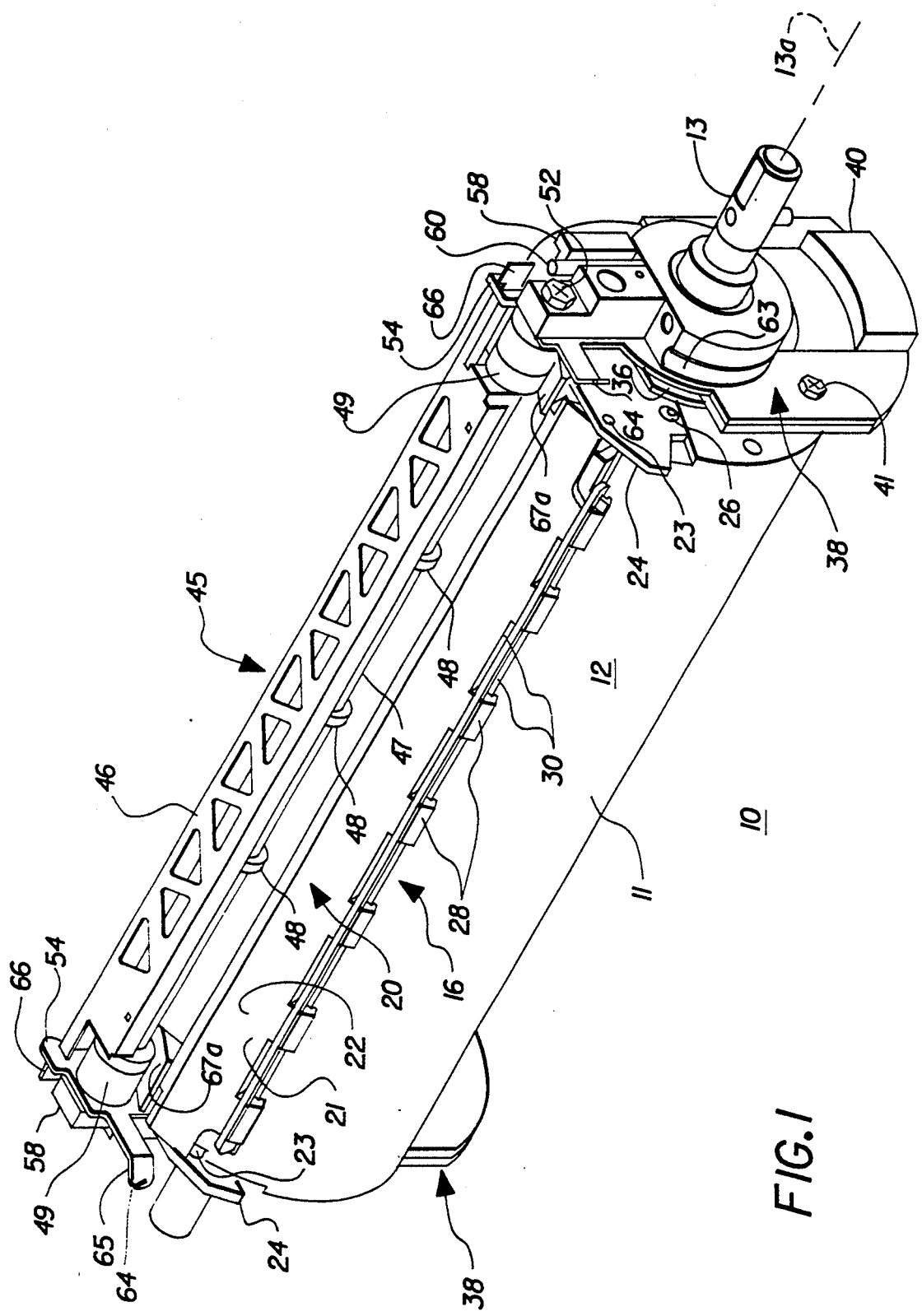
FIG. 1 is an isometric view of a sheet handling apparatus constructed accordance with the present invention.
Figure 2:
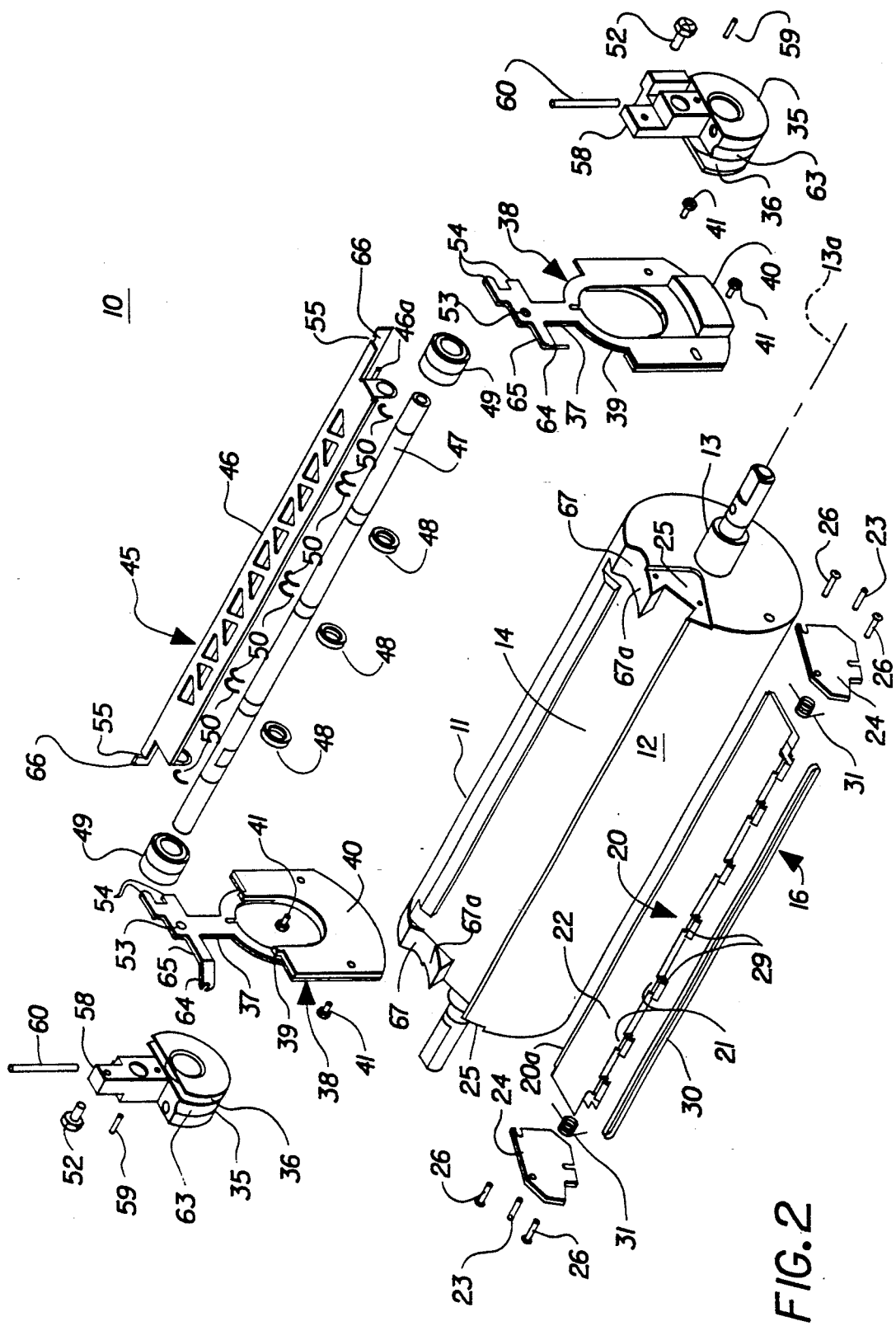
FIG. 2 is an exploded view of the sheet handling apparatus of FIG. 1.
Figure 3:
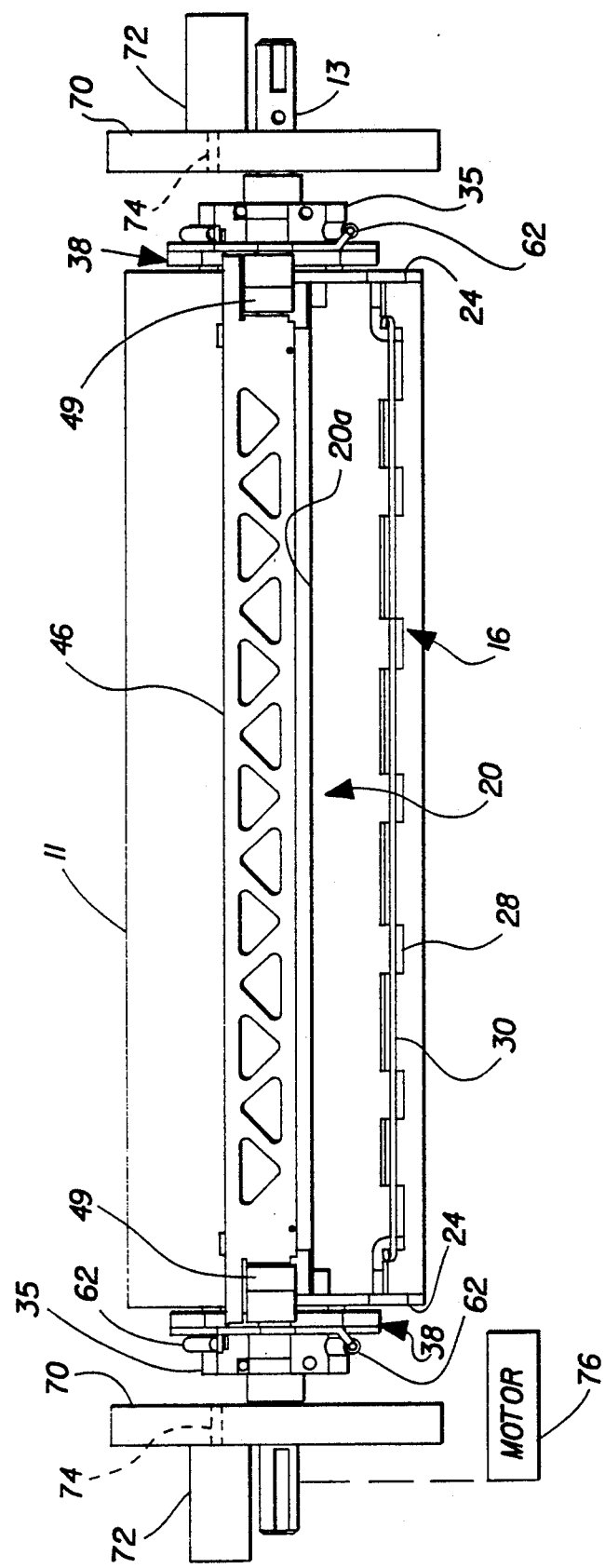
FIG. 3 is a top plan view of the sheet handling apparatus of FIG. 1.

Referring jointly to FIGS. 1–3, the apparatus for rotating a flexible sheet of material about a central axis of rotation is comprised of a drum 11 having a cylindrical surface 12 rotatable about a central axis defined by axle 13. The drum is provided with a recess 14 adapted to receive a lead clamp 16 used to clamp the leading edge of flexible sheet material 18 (FIG. 4) to the drum surface 12. The lead clamp 16 is comprised of an elongated bar 20 having first and second elongated segments 21,22 pivotable about a clamp pivot axis defined by pivot pins 23 which mount the clamp between end plates 24. Plates 24 are set into recesses 25 at either end of drum 11 and are secured thereto by bolts 26. The first segment 21 of clamp 16 extends forward of the clamp pivot axis and is comprised mainly of clamp fingers 28 provided with grooves 29 to receive an elongated O-ring 30 made of soft, resilient material, such as nitrile, useful in gripping and holding the sheet material in place on the drum surface. The second segment 22 of clamp 16 entirely on the opposite side of the clamp pivot axis from the first segment 21 and has a mass that exceeds the mass of the first segment. Assuming clamp bar 20 is of uniform density, the allocation of greater mass in second segment 22 is achieved by eccentric mounting of the bar on pivot pins 23, the pins being closer to O-ring 30 than the back edge 20a of bar 20. Torsion springs 31 are journalled on the clamp pivot pins 23 at both ends of the clamp and serve to normally bias the first segment 21 of the clamp toward the drum surface 12 so as to provide an initial clamping force holding the flexible sheet material 18 against the drum surface. As well seen from the following description, an advantageous feature of the invention is that the bias force exerted by springs 31 need only be sufficient to hold the sheet material on the drum during load and unload operation and also possibly during initial acceleration toward normal operational rotating speed of the drum.

A pair of generally cylindrical sleeves 35 are journalled on axle 13 at opposite ends of the drum 11. Sleeves 35 are provided with recessed grooves 36 to receive the elongated openings of radially slidable frames 38. The frames 38 are in two pieces to allow assembly into the grooves 36 of sleeves 35 and are held together by bolts 41. The first piece 39 of frame 38 is provided with a T-shaped extension 37. In accordance with another feature of the invention, the second piece 40 of frame 38 comprises a counterweight and is located on the opposite side of the central axis 13a of the drum 11 from an associated trail clamp 45 as described below.

A second clamp 45, referred to herein as a trail clamp, is provided to clamp the trailing edge of the flexible sheet material 18 onto the drum surface 12 and is comprised of an elongated clamp bar 46, a trail clamp rod 47, interior contact rollers 48 and outer contact rollers 49. A bead 46a of resilient material, such as polyurethane, is formed on the outer edge of clamp bar 46 to engage and clamp the flexible sheet material to the drum surface once the material has been loaded on the drum. Clamp bar 46 and interior contact rollers 48 are mounted on trail clamp rod 47 and restrained against longitudinal movement on the rod by C-rings 50. Also mounted on trail clamp rod are outer contact rollers 49 which, along with the interior rollers 48, serve to aid in holding the flexible sheet material 18 during loading of the material against the drum surface 12. When assembled, the trail clamp assembly 45 is held between the slidable frames 38 by means of rod bolts 52 extending through holes 53 in the frames. Additionally, fingers 54 on frame extensions 37 extend laterally to engage slots 55 near the outer ends of clamp bar 46.

A pair of radially slidable blocks 58 are secured to the slidable frames 38 by means of the rod bolts 52 and retainer pins 59. Blocks 58 and associated frames 38 are retained in radially slidable relationship to the sleeves 35 and drum 11 by means of retaining rods 60. The function of retaining rods 60 is to prevent rotation of blocks 58 relative to the sleeves 35 while allowing radial motion of the frames 38 and trail clamp 45.

Figure 6:
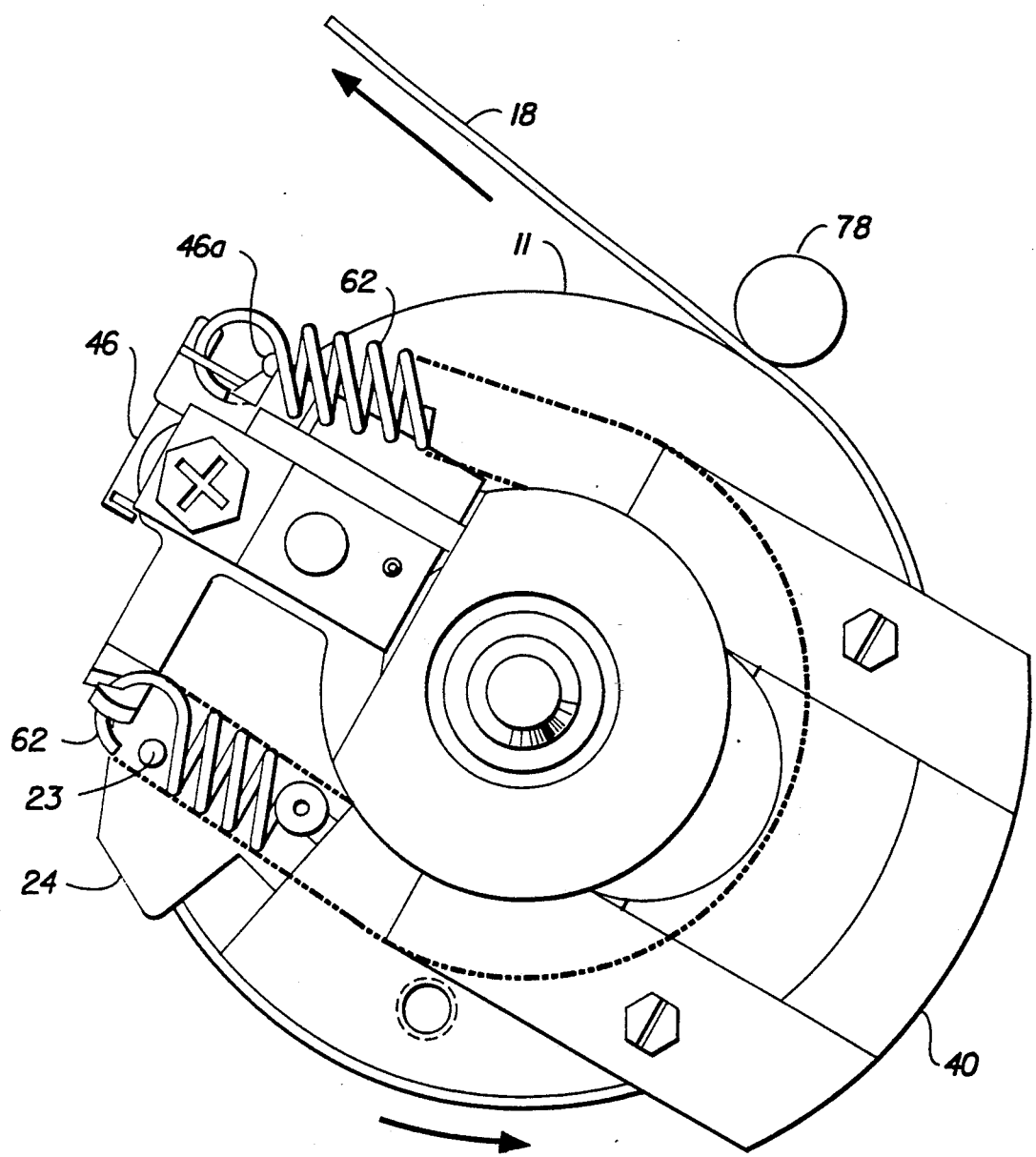

As seen in FIG. 6, a pair of trail clamp tension springs 62 are received in shallow circumferential grooves 63 formed in sleeves 35 and are attached at one end to slots 64 in extension arms 65 on frames 38 and at the other end to slots 66 formed at the outer ends of trail clamp bar 46. When assembled, contact rollers 49 normally reside in cam recesses 67 formed at the outer ends of drum recess 14. Preferably, in this position, the outer edge 46a of trail clamp 45 is pressed against drum surface 12 under the initial clamping force exerted by tension springs 62 with some play between the rollers 49 and the troughs of cam recesses 67. As will be seen in the following description, rollers 49 also serve as cam followers riding up cam surfaces 67a during the sheet material loading and unloading operations.

As seen in FIG. 3, the drum apparatus is mounted between sides of a fixed frame 70. Solenoids 72 are mounted on each frame side 70 and, as will be explained subsequently in more detail, are operated by control circuits, not shown, during loading and unloading operation to project solenoid pins 74 into the space between the rotating frames 38 and fixed frame sides 70 to come into contact with blocks 58 to temporarily prevent the rotation of frames 38. A reversible motor 76 is mechanically coupled to drum axle 13 to control forward and reverse rotation of the drum 11. Unload rollers 78 (FIG. 5) are pivotable toward and away from drum 11 by suitable mechanism (not shown) to aid in directing the sheet material to a receiving cassette during the unload operation.

Figure 4:
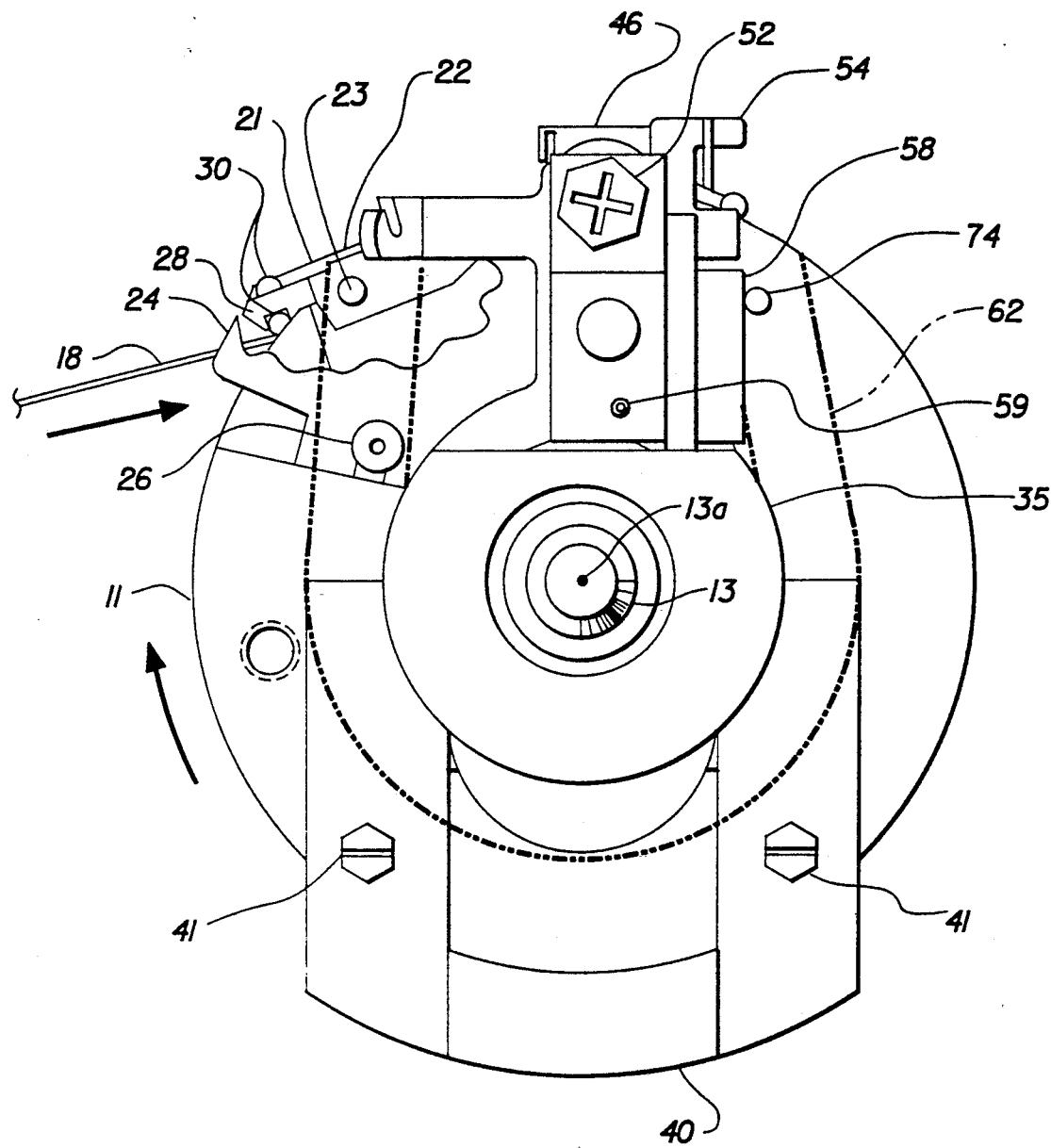
FIGS. 4, 5, and 6 are end views of the sheet handling apparatus of FIG. 1 useful in explaining the operation of features of the present invention.
Figure 5:
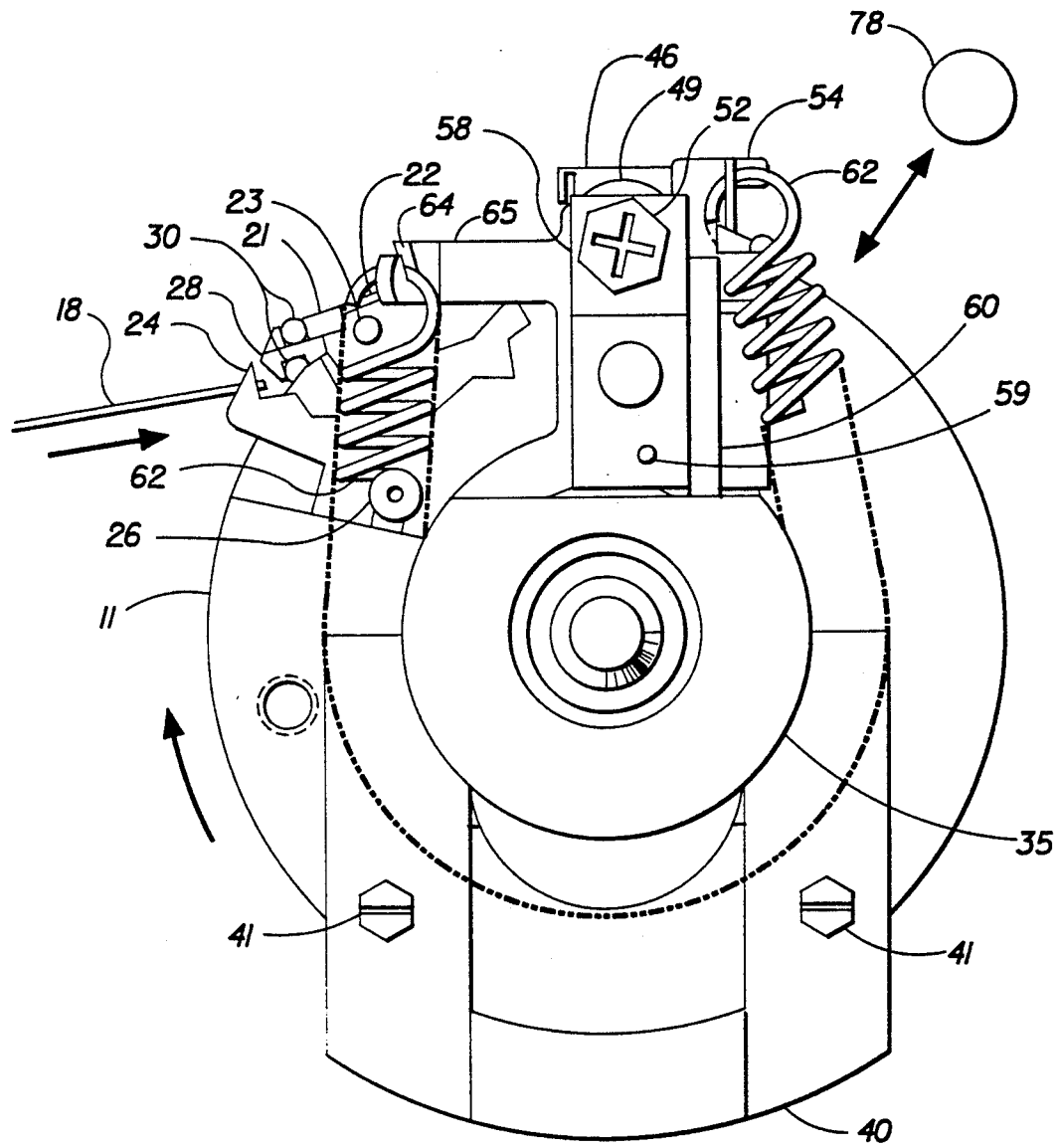

The operation of the drum apparatus will now be described with primary reference to FIGS. 4–6. Since the apparatus on either end of the drum is the same in mirror image, it will be understood that the description applies equally to both sides of the apparatus and, consequently, the plural form is used in the description that follows. The loading of flexible sheet 18 is begun by activating solenoids 72 to drive solenoid pins 74 into the space between frames 38 and fixed frames 70. The drum 11 and frames 38 are then rotated in a clockwise direction until solenoid pins 74 abut the side surfaces of blocks 38, thereby preventing the continued rotation of blocks 38 and trail clamp 45. As the rotation of drum 11 is continued in a clockwise direction, contact rollers 49 ride up the cam surfaces 67a of cam recesses 67 onto the second segment 22 of lead clamp bar 20. At this point, motor 76 is stopped to stop the rotation of drum 11. The biasing force exerted through contact rollers 49 by tension springs 62 on the second segment of clamp bar 20 pivots the clamp bar 20 in the clockwise direction (as viewed in the drawings) about clamp pivot pins 23 thus raising the O-ring 30 away from the drum surface 12 to allow insertion of the flexible sheet material 18 in known manner until it contacts a datum point (not shown) on the under surface of the clamp bar 20. Once the sheet material is positioned under the O-ring of the lead clamp, the drum is restarted in a continuing clockwise rotation. It will be appreciated that since rollers 49 initially followed cam surfaces 67a radially outward from the drum central axis, the entire assembly of blocks 58 and trail clamp 45 is effectively lifted away from drum surface against the restoring force of tension springs 62. Solenoid pins 74 are maintained in an extended position to prevent rotation of the trail clamp 45 as the drum continues its clockwise rotation. Thus contact rollers 49, being radially movable but rotationally stationary, roll off the lead clamp bar 20 and onto the cylindrical surface 12 of the drum 11. With the biasing force of contact rollers 49 removed from the lead clamp 20, the torsion springs 31 return the lead clamp bar 20 and O-ring 30 to their starting position to secure the lead edge of the flexible sheet material between the O-ring and the drum surface 12. Contact rollers 49 continue to follow the edge of drum 11 to "wrap" the flexible sheet 18 onto the cylindrical surface 12. As the drum approaches the 360° rotation point, contact rollers 49 begin to ramp back down into the cam recesses 67 under the restoring force of the tension springs 62. As this rampdown occurs, the beaded edge 46a of trail clamp 45 engages the trailing edge of the flexible sheet material and pulls the sheet taut onto the drum surface during the short remaining rotation of the drum. When the full 360° rotation point is reached, the rollers 49 are fully within the cam recesses 67 and the initial holding force of tension springs 62 secures the trailing edge of the sheet material against the drum surface. At this point, the solenoid pins 74 are withdrawn from contact with blocks 58 whereupon motor 76 is activated to cause the entire sheet handling assembly of drum and clamps to rotate at the relatively high operational speed used for writing or exposure on the sheet material 18.

The operational speed is typically in the range of 1000–2000 rpm which is the same range employed in the sheet handling apparatus of aforementioned U.S. Pat. No. 4,807,868. It has been found, however, that with the apparatus disclosed in that patent in which only the spring restoring force of the clamps is used to hold the sheet material on the drum during operational rotation, the counteracting effects of centrifugal force on the springs causes the sheet material to loosen from the drum as the rotational speeds much exceed 1500 rpm. In the apparatus of the present invention, however, with increasing rotational speed, the inherent loss of gripping force caused by centrifugal force on the sheet contacting edges of the clamps is overcome by the countervailing centrifugal force exerted on the clamps by the apparatus of the invention. Specifically, in the case of the lead clamp 16 of the present invention, the centrifugal force exerted from the greater mass of the second (following) segment 22 of the clamp bar 20 causes the bar to tend to pivot clockwise, namely in a direction that enhances the clamping force on the sheet material as the rotational speed of the drum increases and to thereby exert the primary operational clamping force on the sheet material. Similarly, centrifugal force exerted by the counterweight 40 on the trail clamp 45 enhances the initial clamping force exerted by tension springs 62 and also serves as the primary operational clamping force on the trail clamp thereby counteracting the tendency of the trail clamp to release the sheet resulting from clamp's inherent centrifugal force. Thus, the centrifugal force generated by the high speed rotation of the sheet handling apparatus causes the eccentric balance of lead clamp 16 to further increase the securing pressure of O-ring 30 on the flexible sheet material 18 against the drum surface 12. Concurrently, the counterweights 40 serve to further secure the trailing edge of the flexible sheet material 18 on the drum surface 12 with increasing rotational speed. As a consequence, the sheet is securely retained on the drum surface at rotational speeds up to and exceeding 2000 rpm.

Upon completion of exposure or other processing the flexible sheet material 18, it is necessary to unload the flexible sheet from the drum. To initiate the unloading of flexible sheet, the motor speed is reduced to reduce the drum rotational speed to a suitable level used in the drum loading and unloading operations. Solenoids 72 are activated to drive solenoid pins 74 into the space between frames 38 and fixed frames 70. Unload rollers 78 are pivoted into position to contact the outer trailing edge surface of flexible sheet 18 to aid in directing the sheet removal as previously mentioned. The drum is rotated in a clockwise direction until the solenoid pins 74 abut the surface of blocks 58 thereby preventing further rotation of the blocks and trail clamp 45. The drum is then rotated through a further small clockwise arc such that rollers 49 rise up cam surfaces 67a to raise the trail clamp 45 and release the trailing edge 46a from the sheet material. At this point, before the rollers 49 reach the lead clamp 16, the drum is stopped and reversed to counterclockwise rotation forcing the sheet material to be fed into a receiving cassette (not shown). The solenoid pin is also withdrawn. The drum continues with the counterclockwise rotation until blocks 58 are entirely past the position of the solenoid pins at which time the drum stops rotation and solenoid 72 is activated to extend pins 74 into position to contact blocks 58. The drum is rotated in a clockwise direction causing rollers 49 to ramp up cam surfaces 67a and contact the second segment 22 of lead clamp bar 20 whereupon the leading edge of the sheet material is released from the drum and the sheet is then taken up into the receiving cassette.

It will be appreciated that what has been described is a novel sheet handling apparatus with improved sheet clamping that by virtue of the eccentric pivoting of the lead clamp and the counterweight arrangement for the trail clamp advantageously employs centrifugal force to enhance the clamping action holding the sheet material to the drum surface, even at high rotational speeds at which purely spring loaded clamps would become unreliable.

The invention has been described in detail with particular reference to a presently preferred embodiment, but it will be understood that variations and modifications can be effected within the scope of the invention as set forth in the claims appended hereto.

Parts List 10 sheet handling apparatus
11 drum
12 drum surface
13 central axis
14 recess
16 lead clamp
18 flexible sheet material
20 elongated bar
21 first bar segment
22 second bar segment
23 clamp pivot pins
24 end plates
25 recesses
26 bolts
28 lead clamp fingers
29 grooves
30 O-ring
35 sleeves
36 grooves
38 frames
39 frame piece
40 frame piece
41 bolts
45 trail clamp
46 trail clamp bar
47 trail clamp rod
48 interior rollers
49 contact rollers
50 C-rings
52 rod bolts
53 holes
54 fingers
55 grooves
58 blocks
59 retainer pins
60 retaining rods
62 tension springs
63 grooves
64 slots
65 extension arms
66 slots
67 cam recess 67a cam surface
70 fixed frame
72 solenoids
74 solenoid pins
76 reversible motor
78 unload rollers

What is claimed is:

1. Apparatus for rotating a flexible sheet of material about a central axis of rotation, the apparatus including a drum having a cylindrical surface rotatable about said central axis, a sheet material clamp for clamping an edge of the flexible sheet onto the drum surface, spring bias means for providing said clamp with an initial clamping force on the sheet material and clamp releasing means for selectably releasing the clamp from the sheet material;

the apparatus characterized by:

a clamp comprising an elongated bar eccentrically mounted on the drum about a clamp pivot axis parallel to said central axis such that a greater mass of the bar is on a side of the pivot axis that pivots away from the drum during operational rotation of the drum and a lesser mass of the bar is on a side of the pivot axis that pivots toward the drum for clamping of the sheet material to the drum such that operational centrifugal force is transferred to the clamp to serve as the primary clamping force for securing the sheet to the drum at operational rotating speeds of the drum.

2. The apparatus of claim 1 wherein the clamp has a first segment on one side of the pivot axis adapted to pivot toward said drum surface in response to said spring bias means to apply said initial clamping force to said sheet material and a second segment, opposite the clamp pivot axis from said first clamp segment, adapted to pivot away from the drum surface when clamping force is applied to said sheet material, the second segment having greater mass than said first segment such that centrifugal force exerted by said second segment during rotation of the drum increases the clamping force on the sheet material beyond said initial clamping force with increasing rotational speed of the drum.

3. Apparatus according to claim 2 wherein said clamp releasing means comprises at least one follower roller adapted to engage said second segment of the clamp during sheet material loading and unloading operations to pivot the first segment of the clamp away from the drum surface against the restoring force of said spring bias means.

* * * * *